Dec. 19, 1933.  J. F. McGRATH  1,940,220
BORING TOOL
Filed Feb. 6, 1931  2 Sheets-Sheet 1
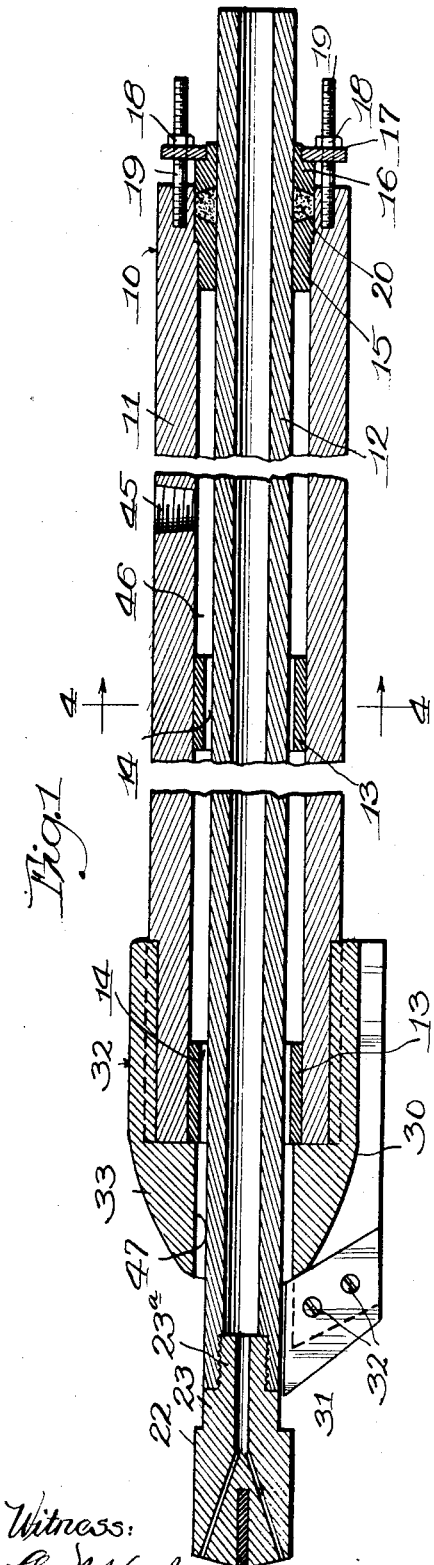
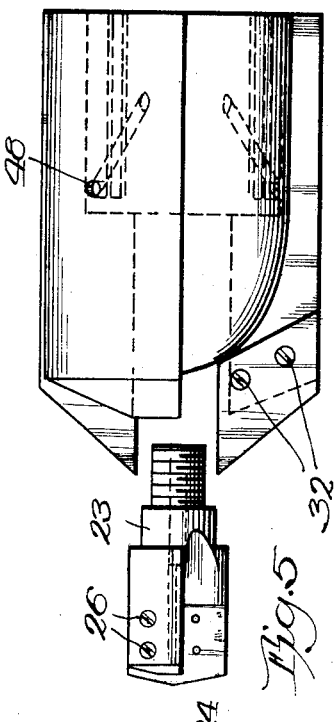
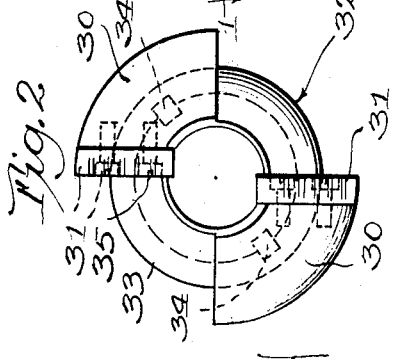
Inventor
James F. McGrath Dec. 19, 1933.    J. F. McGRATH    1,940,220
BORING TOOL
Filed Feb. 6, 1931    2 Sheets-Sheet 2
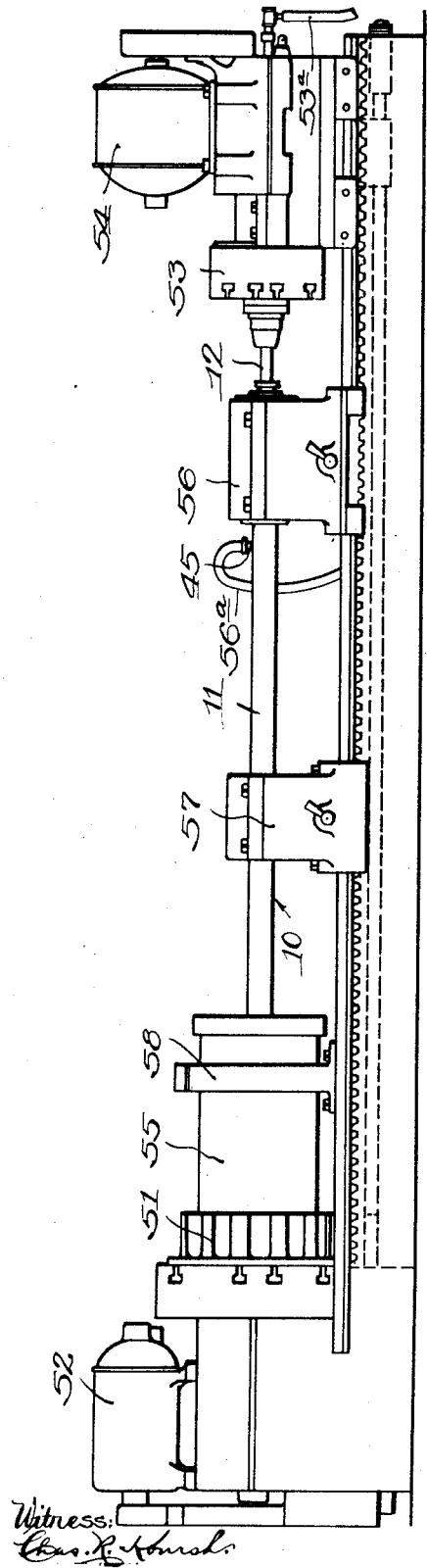
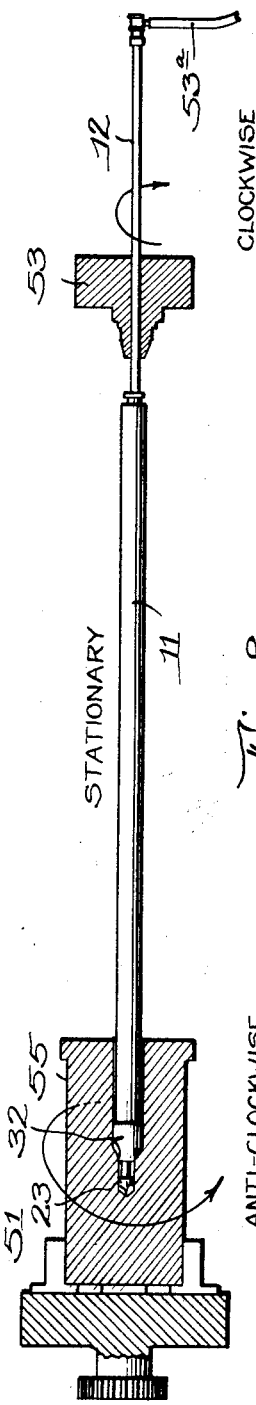

Patented Dec. 19, 1933

1,940,220

UNITED STATES PATENT OFFICE 1,940,220

BORING TOOL

James F. McGrath, Chicago, Ill., assignor to A. Finkl & Sons Company, Chicago, Ill., a corporation of Illinois Application February 6, 1931. Serial No. 513,798

2 Claims. (Cl. 77—68)

This invention relates to improvements in boring tools and method of using the same, and has for its principal object to provide an improved construction for tools of the character described, wherein a leading or pilot cutter is given a greater speed of rotation than the main or following set of cutters, so as to increase the efficiency and speed of the cutting tool.

A further object of the invention is to provide an improved construction and arrangement for supplying lubricant to the working head of the tool.

The invention may best be understood by reference to the accompanying drawings, in which Figure 1 is a longitudinal sectional view of the tool with intermediate portions thereof omitted.

Figure 2 is a front end view of the tool shown in Figure 1, but with the pilot head removed.

Figure 3 is a side view of the main cutter head, removed from the boring bar.

Figure 4 is a transverse section taken on line 4—4 of Figure 1.

Figure 5 is a side view of the pilot head shown in Figure 4.

Figure 6 is a detail front end view of the pilot head.

Figure 7 is a side view of a boring lathe showing one method in which my improved form of boring tool may be employed.

Figure 8 is a diagrammatic view in part section showing the boring tool in operation in the work.

Referring now to details of the embodiment of my invention illustrated in the drawings, the boring tool indicated generally at 10 is made up of an outer tube 11 and an inner tube 12 disposed axially therein and supported for rotation in suitable bushings 13, 13 spaced at intervals between the inner and outer tubes. The bushings 13, 13 are each preferably provided with a plurality of grooves 14, 14 disposed longitudinally thereof so as to permit the passage of lubricant longitudinally between the inner and outer tubes as will hereinafter more fully appear.

A solid bushing 15 is provided at the rear end of the outer tube 11 and carries a packing gland 16 adjustably secured thereto as by a ring 17 and nuts 18, 18 threaded on bolts 19, 19, thus sealing the inner tube 12 within the rear end of the outer tube 11 against leakage of lubricant, and yet permitting relative rotation of the two tubes as will hereinafter more fully appear.

The inner tube 12 carries at its forward end a pilot head or cutter 22, herein consisting of a shank 23 having suitable cutter blades. In the form shown a single cutter blade 24 is detachably secured between two blade supports 25, 25 extending forwardly from the shank 23. As shown in Figure 4, the blade supports 25, 25 have their outer margins concentric with the pilot head, and their inner margins provide supporting engagement for the two diametrically opposite sides of the cutter blade 24. The shank 23 has a reduced portion 23a which is threaded in the end of tube 12.

The outer tube 11 is provided at its forward end with a plurality of blade supports, in the form shown two of such supports 30, 30 being provided, the outer limits of which have a greater radius than that of the outer tube 11, as clearly shown in Figure 2. The supports 30, 30 are carried on a head 32 having a frusto-conical end portion 33 fitting over the end of the tube 11, and secured from rotation by keys 34, 34 (see Figure 2). Cutter blades 31, 31 are detachably mounted at the forward ends of the supports 30, 30, said cutter blades being suitably shaped and positioned in advance of the supports 30, 30 to provide the main cutting medium for the portions of the bore outside of the pilot cutter 22.

As will be seen from Figure 1, the effective diameter of the pilot cutter blade 24 is slightly greater than the distance between the adjacent edges of the cutter blades 31, 31 so that the inner margins of the main cutter blades follow within the bore cut by the pilot blade. The main cutter blades 31, 31 are detachably secured to their supports by suitable means, as for instance screws 35, 35.

Referring now to the means for providing lubrication to the two sets of cutters, it will be observed in Figure 1 that the inner tube 12 is hollow throughout its length to form a lubricant passage 40 which communicates with a passage 41 drilled partly through the shank 23. A pair of ducts 43, 43 are drilled in the blade supports 25, 25 so as to form discharge passages at the front end of said blade supports adjacent the periphery thereof. Lubricant is supplied under pressure through the rear end of the inner tube 12, and is forced from the front end of the pilot head immediately adjacent the cutting edge of the blade 24.

Lubricant is also supplied to the main cutter blades 31, 31 through an inlet 45 formed in one side of the outer tube 11 and communicating with a passage 46 formed between the inner and outer tubes, the bushings 13, 13 being provided with a plurality of grooves 14, 14 as heretofore described, so as to permit the lubricant to pass forwardly and be discharged at the front end of the outer tube adjacent the cutter blades 31, 31. In the form shown, the bore 47 of cap 32 through which the inner tube projects is of greater diameter than said inner tube, so as to permit the lubricant to flow out the front end of said cap directly upon the blades 31, 31. An auxiliary duct 48 is also provided in each of the side faces of the supports 30, 30 and extending at an angle through the cap and outer tube 11 to the interior of the passageway 46 so as to provide lubricant for flushing the outer surfaces of said supports and assist in clearing cuttings which may otherwise have a tendency to collect thereon.

Referring now to the use and operation of the improved form of boring tool above described, a typical installation is illustrated in Figures 7 and 8 in which a multiple boring lathe is indicated at 50 and is provided with a work holding chuck 51 driven through suitable gearing by motor 52 and a live tail piece 53 independently driven through suitable gearing by motor 54. In this form of set-up the work 55 carried by the chuck 51 is rotated in one direction, as for instance, anti-clockwise.

The inner tube 12 is rotated in an opposite or clockwise direction by the tail piece 53. Lubricant under pressure is supplied to the end of tube 12 by hose 53a. The outer tube 11 is held against rotation by a traveling feed block 56. Lubricant is supplied to inlet 45 by hose 56a. One or more intermediate tool supports 57 may be provided as desired. Similarly a support 58 may be provided for the work 55.

The inner tube 12 is rotated at a greater speed than that of the work. For instance in many cases I find that a relative speed of three to one gives very satisfactory results. It will be understood, however, that the speed ratio suggested may be varied considerably, depending upon the nature of the work, and furthermore that similar results may be obtained by holding the work stationary and rotating the inner and outer tubes at differential speeds.

The cuttings are flushed out of the bore by the lubricant which flows between the supports 30, 30 and along the outside of the tube 11.

I do not, therefore, wish to be limited to the specific application of my invention herein illustrated, nor to the specific details of construction and arrangement of the boring tool described, but it will be understood that other modifications and methods of use may be employed without departing from the spirit and scope of my invention.

I claim:

1. In a boring tool, an outer tubular member cutting means at the outer end thereof having a substantially greater cutting diameter than the diameter of said tubular member, an inner tubular member having a pilot cutter disposed in advance of said cutting means, means rotatably supporting said inner tubular member in spaced relation within said outer tubular member to form a passage for flushing lubricant discharging at the front end of said tubular member immediately adjacent said pilot cutter, pressure lubricant supply means communicating adjacent the rear end of said outer tubular member, said pilot cutter having independent pressure flushing lubricant supply means connected with the rear end of said inner tubular member and communicating therethrough to the forward end of said pilot cutter.

2. In a boring tool, an outer tubular member cutting means at one end thereof having a substantially greater cutting diameter than the diameter of said tubular member, an inner member rotatably mounted within said outer member and having a pilot cutter disposed in advance of said cutting means, and means connected adjacent the rear end of said cutter tube for supplying flushing lubricant under pressure between said outer tube and said inner member and discharging said lubricant immediately adjacent said pilot cutter, and independent pressure flushing lubricant supply means communicating through said inner member to said pilot cutter.

JAMES F. McGRATH.